(12) United States Patent
Dyhr (10) Patent No.: US 7,296,922 B2
(45) Date of Patent: Nov. 20, 2007

(54) METHOD AND AN APPARATUS FOR PROCESSING OF LIQUIDS OR PASTES

(75) Inventor: Einar Dyhr, Holte (DK)

(73) Assignee: Delta Process Engineering ApS, Holte (DK)

( * ) Notice: Subject to any disclaimer, the term of this patent is extended or adjusted under 35 U.S.C. 154(b) by 201 days.

(21) Appl. No.: 10/969,083

(22) Filed: Oct. 20, 2004

(65) Prior Publication Data

US 2005/0058015 A1    Mar. 17, 2005

Related U.S. Application Data

(63) Continuation of application No. PCT/DK03/00265, filed on Apr. 23, 2003.

(30) Foreign Application Priority Data

Apr. 23, 2002   (DK) .......................... PA 2002 00603

(51) Int. Cl.
*B01F 5/06* (2006.01)
(52) U.S. Cl. .................... 366/160.4; 366/268; 366/269
(58) Field of Classification Search ................ 366/267, 366/268, 269, 106.4
See application file for complete search history.

(56) References Cited

U.S. PATENT DOCUMENTS

| | | | | |
|---|---|---|---|---|
| 126,735 A | * | 5/1872 | Moxley | ...................... 366/268 |
| 265,442 A | * | 10/1882 | Reesman | ...................... 366/268 |
| 357,027 A | * | 2/1887 | Ping | ........................... 366/257 |
| 950,069 A | * | 2/1910 | Farrar | .......................... 68/190 |
| 1,264,071 A | * | 4/1918 | Hensrud | ...................... 366/257 |
| 3,035,820 A | * | 5/1962 | Todd et al. | ................... 366/268 |
| 4,350,650 A | * | 9/1982 | Cereghini | ..................... 264/39 |
| 4,915,881 A | * | 4/1990 | Straw et al. | ................. 261/152 |
| 5,165,325 A | | 11/1992 | Akatsu | |
| 5,658,610 A | * | 8/1997 | Bergman et al. | ............ 426/665 |
| 5,882,605 A | | 3/1999 | Sortwell | |
| 6,062,722 A | * | 5/2000 | Lake | .......................... 366/130 |
| 6,158,981 A | * | 12/2000 | Raghavan et al. | .......... 417/395 |

FOREIGN PATENT DOCUMENTS

| | | |
|---|---|---|
| EP | 0 518 054 | 12/1992 |
| FR | 2 735 039 | 12/1996 |
| WO | WO 94 21145 | 9/1994 |

* cited by examiner

*Primary Examiner*—Tony G Soohoo
(74) *Attorney, Agent, or Firm*—Klein, O'Neill & Singh, LLP; Howard J. Klein (57) ABSTRACT

An apparatus for processing a liquid or a paste, particularly a highly viscous or sticky liquid or paste, includes two or more cylindrical storage chambers, and at least one interconnecting conduit interconnecting the storage chambers. The liquid or paste is processed in the interconnecting conduit by a suitable processing device or mechanism that is operably associated with the interconnecting conduit. A piston displaces the liquid or paste from one cylindrical storage chamber to another through the interconnecting conduit, such that the liquid or paste is processed by the processing device or mechanism during its displacement.

34 Claims, 7 Drawing Sheets

METHOD AND AN APPARATUS FOR PROCESSING OF LIQUIDS OR PASTES

CROSS-REFERENCE TO RELATED APPLICATION

This application is a continuation of co-pending International Application no. PCT/DK03/00265, filed Apr. 23 2003, the disclosure of which is incorporated herein by reference.

The present invention relates to a method and an apparatus for processing of liquids or pastes which due to their high viscosity are difficult to effectively subject to mechanical and thermal processes without extensive loss of product and extensive cleaning of the processing apparatus.

By use of two piston equipped storage cylinders interconnected by a process chamber, the liquid or paste to be processed is pushed and/or pulled from one cylinder to another, each time passing through the process chamber, until the process is completed. The final product is then pushed out by the pistons through a processing head discharge valve for further processing or packaging.

As both cylinders can be almost completely emptied by the pistons, the only product residue left is that in the relatively small process chamber. Thus the process has a high yield.

The process chamber can expose the product to a series of different processes, for instance mixing in of additives, chopping, blending, milling, heating, cooling and evaporation all depending on which process configuration the process chamber has, and as the velocity and internal pressure of the liquid or paste being processed is completely controlled between the two cylinder pistons, this increases the accuracy of the process.

Thus, the present invention relates to a method and an apparatus for processing highly viscous fluids or pastes such as fruit preserves, candy, liquorice and other liquids or pastes of various kinds which require mixing, blending heating/cooling or other mechanical or chemical processes.

Products which become highly viscous during the process are very hard to handle. Normal processes such as agitation, grinding, heating, cooling become almost impossible to perform without use of special pumps, agitators and mills. Use of such special equipment installed in the process line often results in low yield. Most known processes with highly viscous products use a combination of heating and mixing vessels with attachment of re-circulation mills and blenders. As the viscosity increases the product becomes more and more difficult to handle and empty from the vessel, and mixing effectively when re-circulating back to the same vessel becomes impossible as highly viscous fluids do not mix well.

Blending and chopping of a highly viscous product is made difficult as the product tends to bridge or activate around the blending knife, thus preventing the knife from getting into contact with the product.

The object of the invention is to have full control over the product through the entire process, incl. to have the product pressurised as it passes through the blender/mixer head as well as an external heat exchanger, and to do this in a matter that results in a high yield.

According to the invention, this is achieved by means of an apparatus for processing a liquid or a paste, in particular for processing a highly viscous or sticky liquid or paste, said apparatus comprising:
two or more cylindrical storage chambers,
one or more interconnecting conduits adapted and arranged for interconnecting said storage chambers,
one or more processing means for processing said liquid or paste, said processing means being associated with said interconnecting conduit, and
a piston arranged axially displaceable for displacing said liquid or paste from one cylindrical storage chamber to another through said interconnecting conduit such that said liquid or paste is processed by said processing means during said displacement.

Hereby, a simple and easily controllable apparatus is achieved that requires very little cleaning and has very reduced dead space resulting in very reduced loss of yield.

In the following a number of advantageous and useful embodiments of an apparatus according to the invention will be listed.

Advantageously, said cylindrical storage chambers are located within circular cylindrical storage cylinders each having a piston arranged axially displaceable from a top position to a bottom position inside each of said storage cylinders.

Advantageously, two of said cylindrical storage chambers are located within a common circular cylindrical cylinder with said piston constituting a partition between said two storage chambers.

Advantageously, said processing means are selected from a group of processing means comprising, mixing devices, cutting devices, grinding devices, milling devices, heating means, cooling means, chipping devices, blending devices, chopping devices injection devices for injecting a gas, a liquid or a solid into said liquid or paste, and extraction devices for extracting a gas, a liquid or a paste from said liquid or paste.

Advantageously, three or more containers are interconnected in series by said interconnecting conduits.

Advantageously, each of a cluster of three or more containers are interconnected with at least two of the other containers in said cluster by said interconnecting conduits.

Advantageously, at least one container of a cluster of containers is interconnected with at least one container of another cluster of containers by said interconnecting conduits.

Advantageously, two containers are interconnected by at least two interconnecting conduits.

Advantageously, said processing means is located in a cavity or chamber in said interconnecting conduit.

Advantageously, at least two processing means are located in an interconnecting conduit extending between two of said containers.

Advantageously, said processing means are located in series.

Advantageously, said processing means are located in parallel.

Advantageously, piston displacement means for axially displacing said pistons are adapted for varying the force applied to said pistons in both opposed displacement directions of said pistons.

Advantageously, said interconnecting conduit is flanged directly to said cylinders for forming an integral construction.

Advantageously, wherein said interconnecting conduit is provided with an inlet for introducing said liquid or paste into said conduit.

Advantageously, said interconnecting conduit is provided with an inlet for introducing additional fluids into said conduit.

Advantageously, said interconnecting conduit is connected to two additional cylinders each having a volume larger than the volume of said interconnecting conduit.

Advantageously, said apparatus is further provided with control means for allowing filling and emptying of said additional cylinders with said liquid or paste during or immediately after said liquid or paste is discharged from one of said cylindrical storage chambers.

Advantageously, heat exchange means are provided for heating or cooling said liquid or paste inside said storage chamber.

Advantageously, said storage chamber is connected to a vacuum source.

Advantageously, the top end of said storage cylinder is connected to a circular cylindrical co-axial chamber with larger interior diameter than the storage cylinder, said piston being adapted and arranged for being retracted into said co-axial chamber.

Advantageously, an aperture is provided in the wall of said co-axial chamber for allowing liquid, paste or solid material to be introduced into said co-axial chamber.

Advantageously, an aperture is provided in the wall of said co-axial chamber for allowing gas to be extracted to said vacuum source.

Advantageously, a nozzle is provided in the wall of said co-axial chamber for spraying cleaning fluid into the co-axial chamber.

Advantageously, a mixing device is provided on or at the pressure side of said piston in said storage cylinder.

Advantageously, said mixing device is a propeller or agitating head mounted on the pressure side of said piston and connected to a shaft extending through a passage in the piston rod of said piston.

Advantageously, two or more, preferably three, cylindrical storage cylinders forming a first cluster are connected to a common piston displacement means for displacing the pistons in the individual cylinders in mutual synchronisation.

Advantageously, all said cylindrical storage cylinders of said cluster are connected to a common processing means associated with a common interconnecting conduit communicating with one or more further cylindrical storage cylinders.

Advantageously, the interconnecting conduit between a first cylindrical storage chamber or cluster thereof extends to a common processing unit, the interconnecting conduit branching into two branches, each branch extending to a respective second and third cylindrical storage chamber.

Advantageously, the interconnecting conduit extending form said cylindrical storage chamber to said processing means is constituted by a cylinder with a piston being arranged axially displaceable from a first position adjacent the outlet from said storage chamber into said interconnecting conduit to a second position adjacent said processing means.

Advantageously, an additive cylinder with piston is connected to said interconnecting conduit or said processing means for injecting additive thereto.

Advantageously, means are provided for synchronising the displacement of the piston in said additive cylinder with the displacement of the piston in a cylindrical storage chamber.

In a further aspect the present invention relates to a method for processing a liquid or a paste, in particular for processing a highly viscous or sticky liquid or paste, said method comprising the following steps:

providing an apparatus according to any of the preceding claims, introducing said liquid or paste into a first of said cylindrical storage chambers, and displacing the piston in said first cylindrical storage chamber such that said liquid or paste is displaced trough said interconnecting circuit and said processing means and into a second of said cylindrical storage chambers.

Advantageously, the method comprises the further step of displacing the piston in said second cylindrical storage chamber such that said liquid or paste is displaced trough said interconnecting circuit and said processing means and into said first cylindrical storage chamber.

In the following, the invention will be explained more in detail in connection with various embodiments of an apparatus according to the invention shown, solely by way of example, in the accompanying drawings, where.

Figure 1:
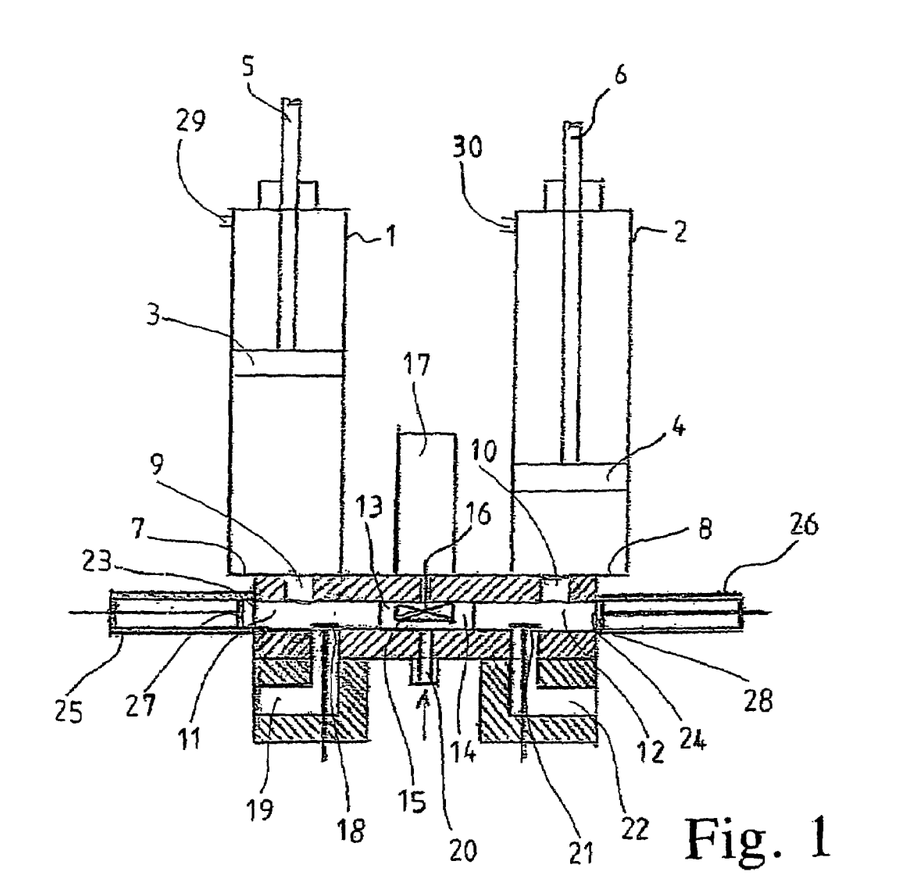
FIG. 1 is a schematic elevational view of a first embodiment of an apparatus according to the invention.
Figure 2:
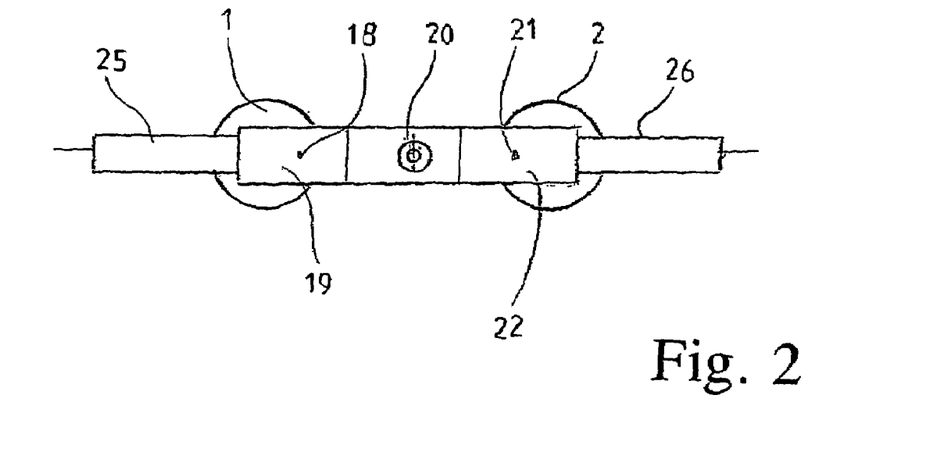
FIG. 2 is a schematic lateral view of the apparatus in FIG. 1.
Figure 3:
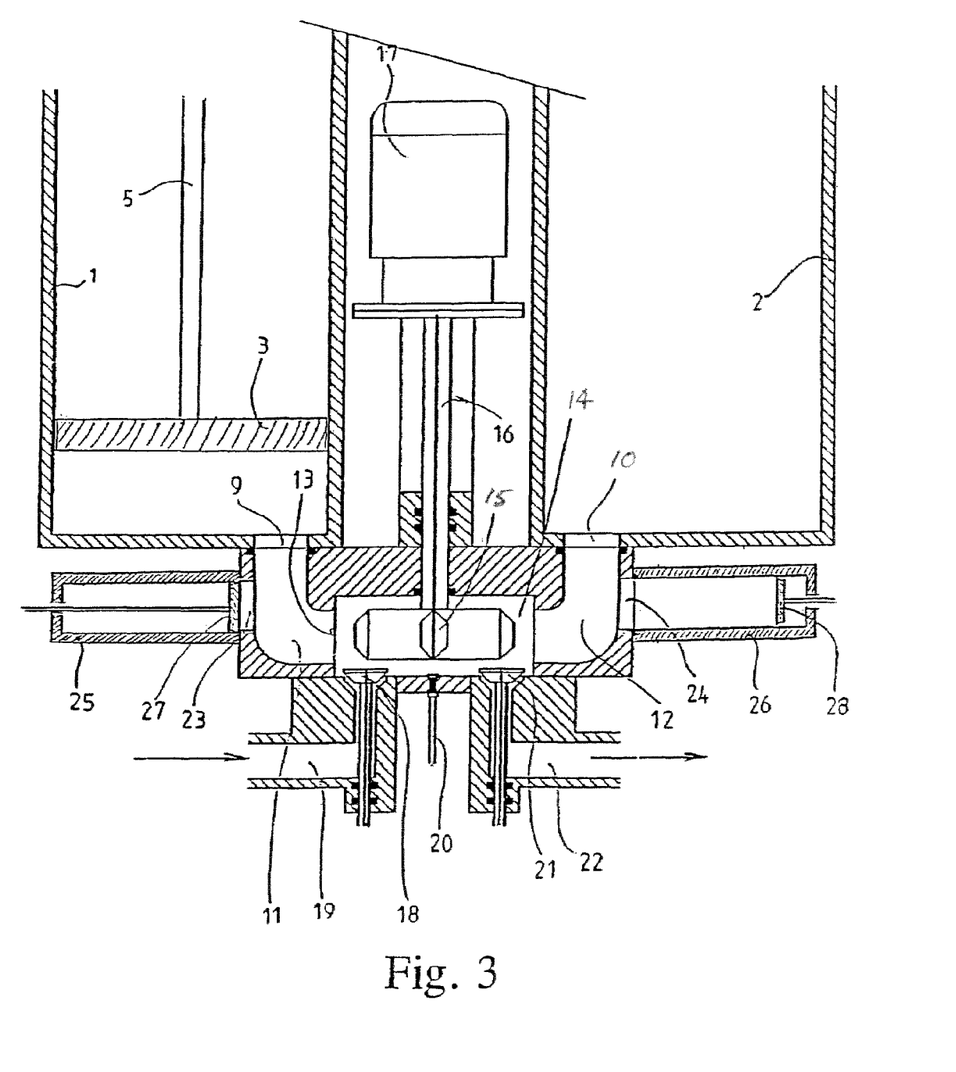
FIG. 3 is a schematic, broken away, enlarged scale, sectional view of the discharge/inlet end portion of an apparatus very similar to the apparatus in FIG. 1.

Referring now to FIGS. 1-3, two cylinders 1 and 2 are arranged parallel to one another and with their axes in the same plane. Pistons 3 and 4 are arranged axially displaceable inside cylinders 1 and 2, respectively, by means of piston rods 5 and 6, respectively. Each rod is outside the respective cylinder connected to a not shown drive cylinder which has the same stroke length as the respective pistons 3 and 4.

In the end of the cylinder there is a flange 7 and 8, respectively, (see FIG. 2) with outlets 9 and 10, respectively, to conduits 11 and 12, respectively, leading to a processing chamber 13 for such processing applications as mixing, blending, milling, chopping and direct steam injection for heating. Thus, in its intended position, the process chamber 13 forms part of the connection between the two cylinders 1 and 2.

The processing chamber 13 has the following features: a process cavity 14 for mounting for example a mixer/blender/chopper tool 15 driven by a shaft 16 rotated by a motor 17; a check valve 18 for a product/additive dispensing or inlet line 19; a steam, liquid or gas injection nozzle 20 and an extrusion outlet valve 21 leading to a product discharge line 22.

The process chamber can be formed as a string or series of several interconnected cavities, each cavity containing a different device such as a rotating or injection device; the cavities may contain several blending-mixing knives or rollers for milling, etc. Typical for the configuration is that the product must pass through the string of cavities to get from one cylinder to the other. Each cavity can also have its own injection valve; additives will typically be injected in the mixing cavity; steam or gas could also be injected in this cavity for heating, sterilising, foaming or otherwise affecting the product.

If the product needs heating or cooling, the cylinders 1 and 2 can be connected to a not shown external heat exchanger such as a so-called scraped heat exchanger which is ideally suited for this purpose.

In the wall of the conduits 11 and 12 to the cylinder inlets 9 and 10 there are connected outlets 23 and 24 of two additional small cylinders 25 and 26, respectively, each with a piston 27 and 28, respectively, the end of each cylinder 25 and 26 forming a perfect seal with the walls of the conduits 11 and 12. The cylinders 25 and 26 each have a volume which exceeds the internal volume of the conduits 11 and 12 plus the processing chamber 14. To avoid a so-called dead space in the process of pushing a column of product from for example cylinder 1 to the cylinder 2, the piston 28 in cylinder 26 will retract from its closed position and allow already processed product to fill the cylinder 26. When the entire product in cylinder 1 has been forced through the process chamber 14 and into cylinder 2 the piston 3 in cylinder 1 is stroked out and the piston 28 in cylinder 26 forces the small volume of product in cylinder 26 into cylinder 2. This will assure that all the product in cylinder 2 or the discharge side of the chamber 14 has been processed. When the flow is reversed from cylinder 2 to cylinder 1, the same procedure is repeated by means of the cylinder 25.

A typical process can be visualised as follows:

The product is pumped or sucked into cylinder 1 through the valve 18 as the piston 3 retracts. During this process pistons 4, 27 and 28 are in their forward positions allowing no product to enter cylinders 2, 25 and 26, respectively. Then the drive for cylinder 1 is activated to force the product through the processing chamber 14 into cylinder 2, wherein the piston 4 now will retract corresponding to the rate of filling of cylinder 2. During this process additives or steam can be injected into the processing chamber 14 giving the product a thorough mix, heat, blend, etc.

When the cylinder 1 is empty, the process reverses and the product is pushed from cylinder 2 to cylinder 1 by the piston 4. During this procedure the processing means in chamber 14 can still be active.

This process can be repeated as many times as it takes to obtain the desired degree of processing, for instance viscosity, grain size, temperature, etc. The dead space cylinders 25 and 26 are active during each cycle to improve the uniformity of the process.

An important feature is to pressurise the product during its passing through the processing chamber 14 as this allows for some unique properties such as minimising cavitation. This is done by applying a variable back-pressure to the receiving cylinder drive rod, varying from almost equal to the discharge cylinder pressure (the same product pressure in both cylinders 1 and 2) to no pressure at all (nil product pressure in the receiving cylinder)

When the product is ready, the discharge valve 21 is opened and both pistons 3 and 4 move forward to discharge the volume of product from both cylinders 1 and 2.

Since the pistons 3 and 4 scrape 100% of the cylindrical surface of the cylinders 1 and 2, the loss of product mainly relates to the volume of the processing chamber 14 and conduits 11 and 12, and since this can be made to constitute a relatively small fraction of the gross volume, a high yield can be expected.

The entire process and associated cleaning can be computer controlled and therefore automatic.

A further refinement of the process is to install a not shown jacket enveloping each main cylinder 1 and 2 for heating the product by steam or hot liquid, while at the same time introducing vacuum suction through an outlet at the end of each main cylinder 1 and 2 opposite the processing outlets 9 and 10 through vacuum conduits 29 and 30, respectively. This process will then reduce the level of liquid in the product by evaporation.

A practical way to this is to retract the piston (3 and/or 4) to a top position allowing the vacuum suction outlet 29 and 30 to be exposed to the product surface. When heat is applied to the jacket, the evaporation will start. By not adding heat to the product, the evaporation causes the temperature to fall and thus the process can be used for cooling the product.

Figure 4:
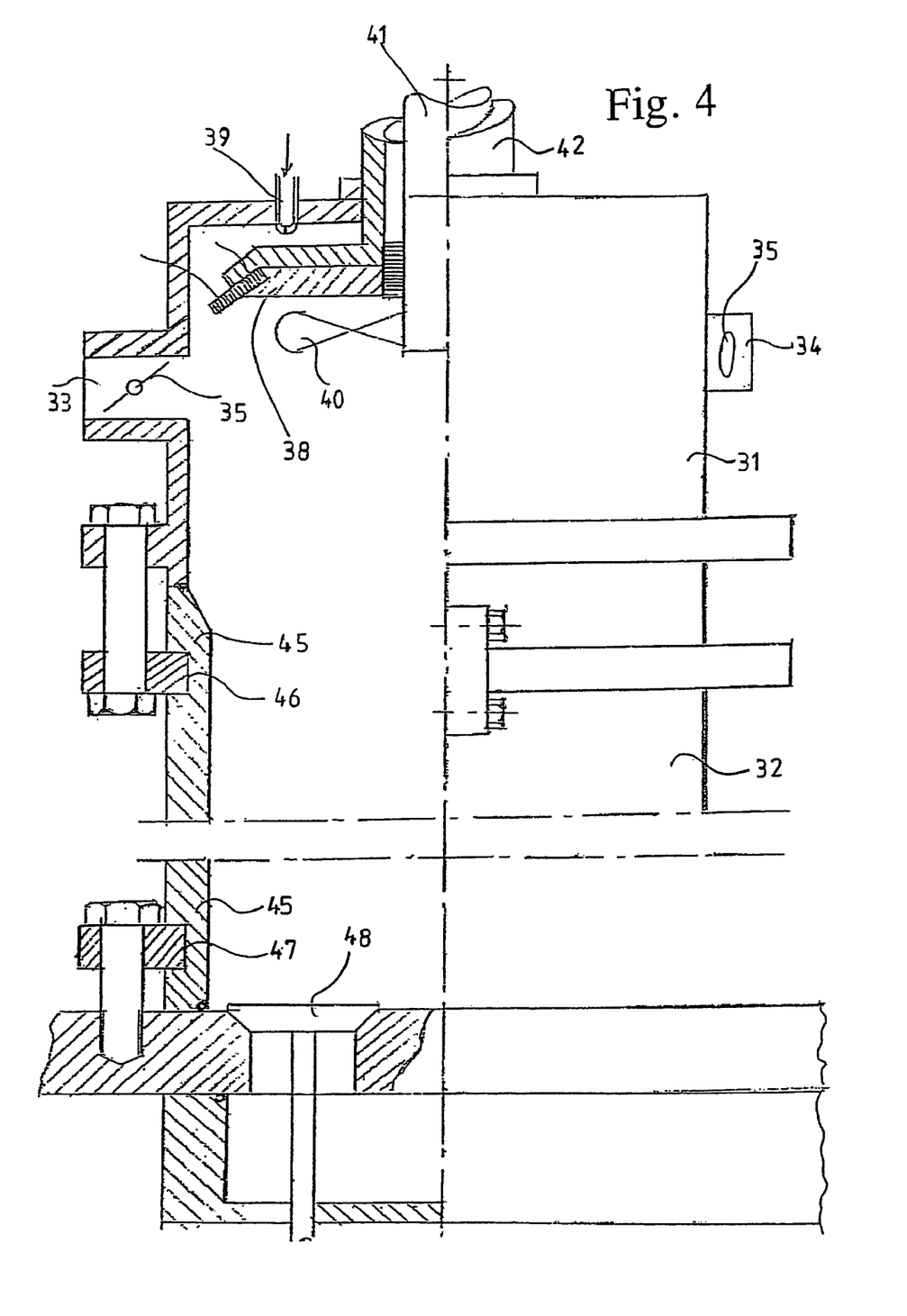
FIG. 4 is a schematic, broken away, enlarged scale, partly sectional view of the head end portion and opposed discharge/inlet portion of a further embodiment of an apparatus according to the invention.

A further refinement is shown in FIG. 4 where a housing 31 or vacuum head is mounted on the drive side of one of the process cylinders 32. This head has a larger inside diameter than the process cylinder. On the head one or more outlets/inlets 33 and 34 are provided with valves 35. When the piston 36 with seal 37 and retainer 38 is pulled into the head 31, a passage is open to the inside of the cylinder 32. This passage can be used typically for intake of raw material through inlet 33or evacuation of air through outlet 34.

Above the piston 38 nozzles 39 are provided through which water or cleaning fluid can be injected to either add water to the process or to clean the space behind the piston 36 or for that mater the entire cylinder 32.

As a further refinement the cylinder 32 may be equipped with an agitator 40 which is driven by a shaft 41 extending through the piston shaft 42 and supported by a seal bearing 43. The purpose of the agitator is to assist in the pre-mixing of raw material and liquids in the cylinder 32 prior to pushing the product out through valve 48 for commencing the push-pull process. The cylinder has machined grooves 46 and 47 for mounting connection brackets 45 to the vacuum head 41 and the support flange 49. This feature allows for easy mounting and exchange of cylinder and head without distorting the honed inside surface of the cylinder 42.

Figure 5:
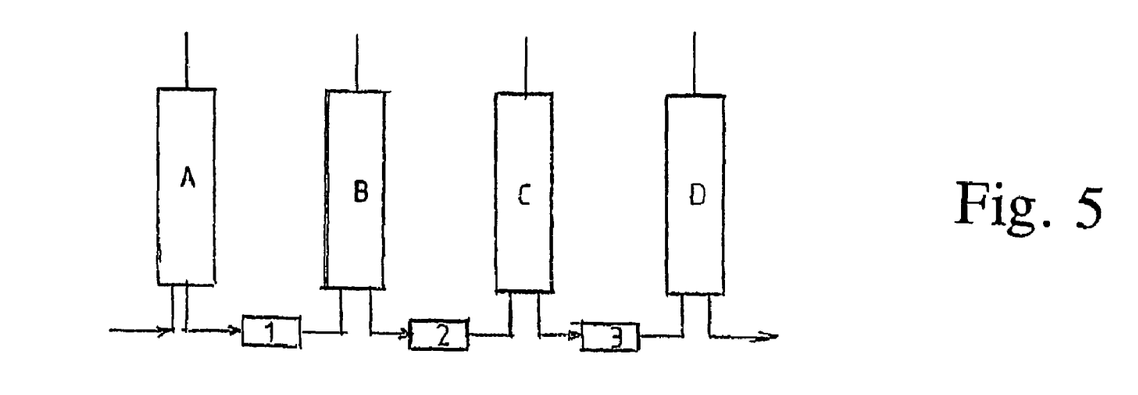
FIGS. 5 and 6 are very diagrammatic views of further embodiments of an apparatus according to the invention.

The process can also be divided into a series of several sub-processes as shown in FIG. 5 where cylinders A-B-C-D are interconnected in series through processing chambers 1, 2 and 3. This can be an advantage where several separate processes are required. In this alternative the processing is continuous in contrast to the batch processing in FIG. 1.

Figure 6:
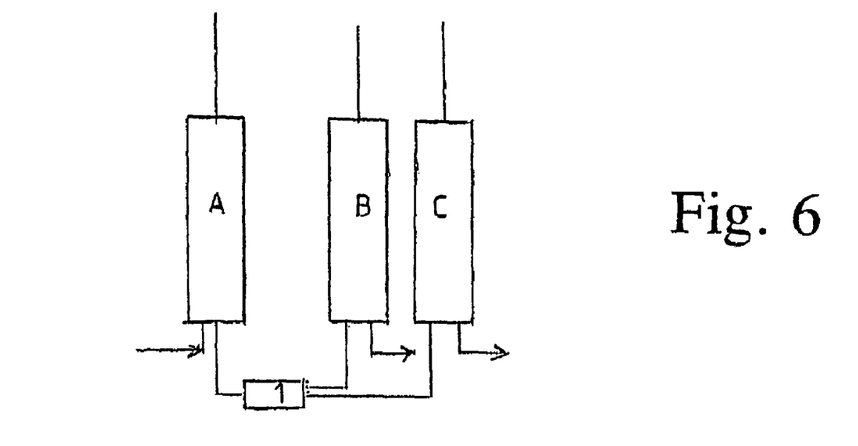

FIG. 6 shows an arrangement where the cylinders are connected in parallel. This is an advantage where producing continuously to a filling line and where for example the process in process chamber 1 is going on between cylinders A and B and finished product in cylinder C is being pushed to the filling line or for further processing. When the cylinder C is empty the process shifts between cylinders A and C and now cylinder B discharges product.

Figures 7, 8:
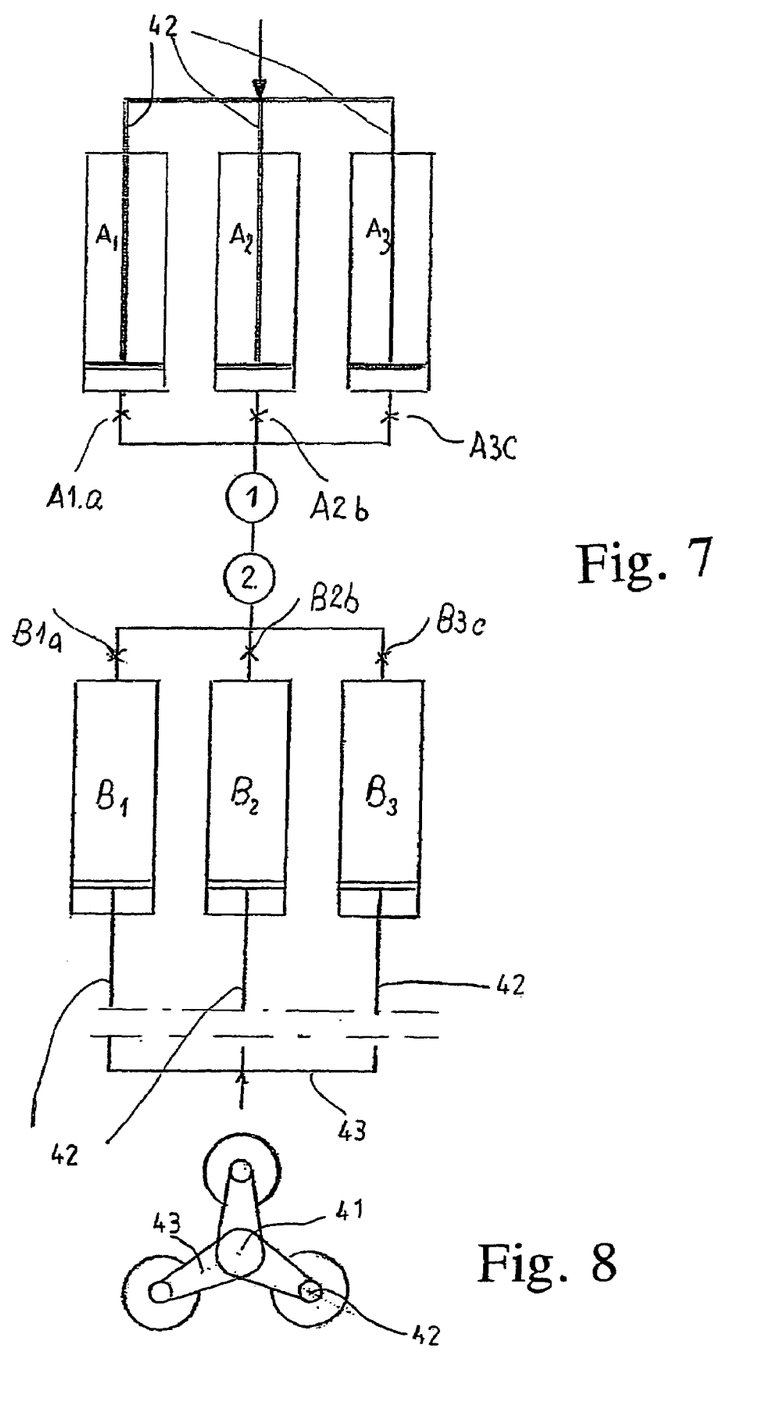
FIGS. 7 and 8 are very diagrammatic, elevational and end views, respectively of a further embodiment of an apparatus according to the invention.

FIGS. 7 and 8 show an arrangement where cylinders A1-A3 and B1-B3 are arranged in clusters of 3 cylinders, the clusters being interconnected over valves A1*a*-A3*c* and B1*a*-B3*c* and two processing chambers 1 and 2. Another arrangement could have 2 or 4 or more cylinders.

In this arrangement it is possible to shift the product between cylinders and thus avoiding the dead space cylinders 25 and 26 in FIG. 1, by operating the valves A1*a*-A3*c* and B1*a*-B3*c*, respectively associated with the receiving cylinders in different sequences. Thus, if Cylinders A1-A3 are discharging into cylinders B1-B3, all valves A1*a*-A3*c* are fully open, while valves B1*a*-B3*c* are opened and closed individually in predetermined sequence so that the cylinders B1-B*r* are filled at different rates. Vice versa when discharging from cylinders B1-B3.

The 3 cylinders on each side of the process chambers 1 and 2 can be driven by a common outside source like a hydraulic cylinder located in the geometrical centre of the 3 cylinders. FIG. 8 shows a common drive cylinder 41 connected to each cylinders piston rod 42 by brackets 43.

Figure 9:
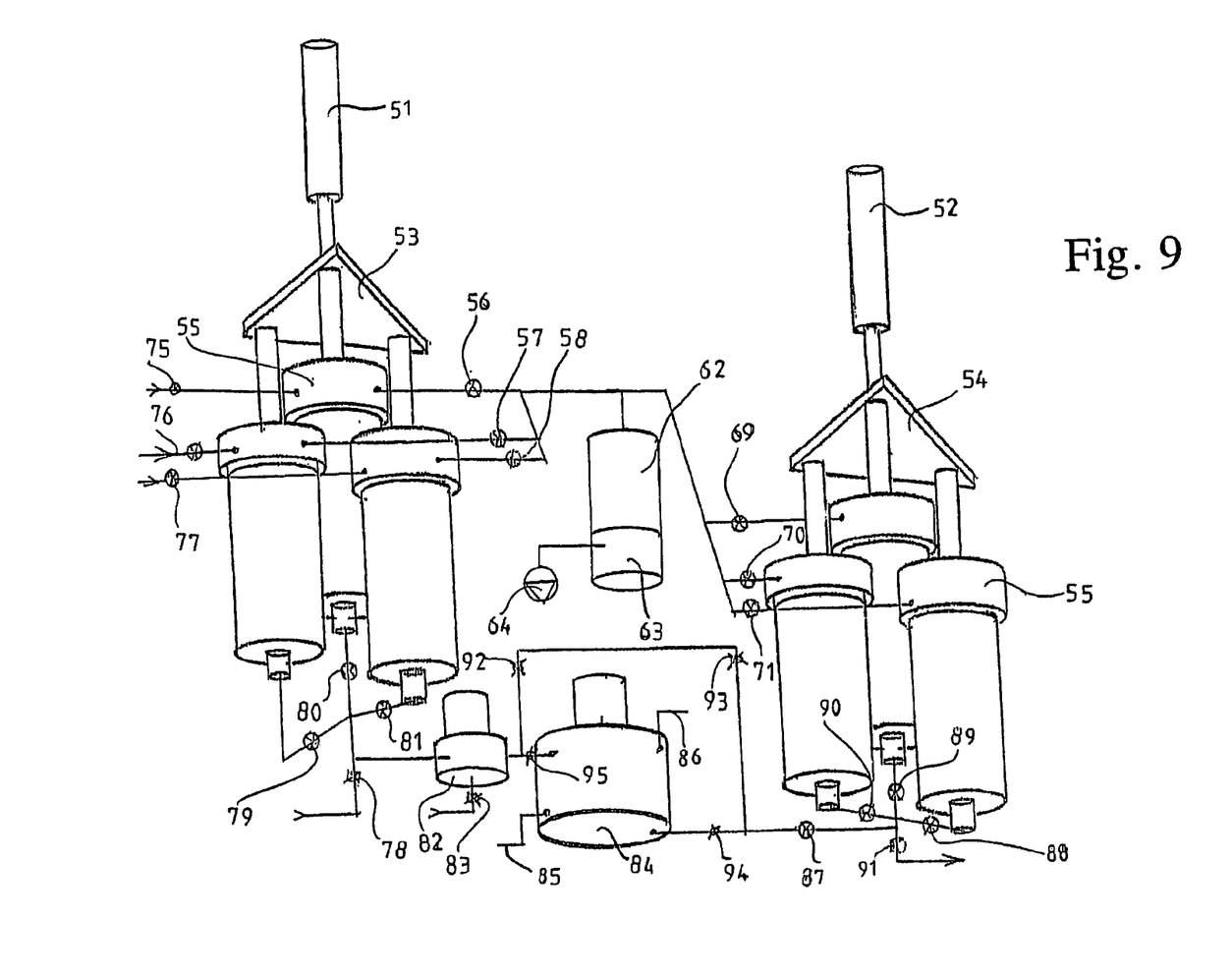
FIG. 9 is a diagrammatic view of a yet further embodiment of an apparatus according to the invention.

A larger process system is shown in FIG. 9 where 2 clusters are shown. Each cluster is driven by its own hydraulic cylinder 51 and 52 each affecting the three process cylinders by means of a load bracket 53 and 54, respectively. Each process cylinder is equipped with a vacuum head 55 for connection to a common manifold heat exchanger 62, receiver 63 and vacuum pump 64 through valves clusters 56, 57, 58 and 69, 70, 71.

Intake of raw material to the intake cylinder cluster is through valves 75, 76, 77 and intake of raw material into the process line is through valve 78. Discharge valves from the intake cylinder cluster are referenced 79, 80, 81.

A processing unit or chamber 82 is provided with a valve 83 for injecting steam, gas or liquid into the process chamber 82. From the process chamber 82 the product can pass through a heat exchanger 84 that is cooled or heated through connections 85, 86 to a not shown outside energy source. The cooled or heated product is now passed on via a valve 87 to the second or receiving cluster of three cylinders where its distributed to the three process cylinders by valves 88, 89, 90. By opening and closing these valves individually while receiving the product it is possible to mix the product in such a way that the dead-space problem can be eliminated as described above in connection with FIG. 7. When the process is completed, the product is discharged through valve 91.

A typical process can be described as follows:

Product such as powder or liquid is sucked into the first or intake cluster by means of valves 75,76,77 or through valves 78,79,80,81. When the cylinders are full, the hydraulic cylinder 51 acts on the pistons of the cylinders in the intake cluster and forces the product out through valves 79,80,81 to the processing unit 82. During this process additives can be added through valve 78. In the processing unit 82 the product can be mixed, blended, sliced, sheared, etc depending on the configuration of the unit.

During this process steam to heat, gas to interact, etc. can be injected through valve 83.

The product passes to the heat exchanger 84, where its cooled or heated if required or bypassed via open valves 92,93 with valves 94, 95 closed.

Inside the second or receiving cluster vacuum can be pulled through valves 69,70,71 and if the product is heated evaporation could start as the product moves into the cylinders. The vapours from this process are condensed in the condenser 62 and accumulated in the receiver 63 which connects to the vacuum pump 64.

Heating/cooling and processing in the process head and evaporation can now be repeated by pushing the product back from the receiving cluster into the intake cluster. When the process is completed the product is forced out through valve 91 while valve 87 is closed.

Figure 10:
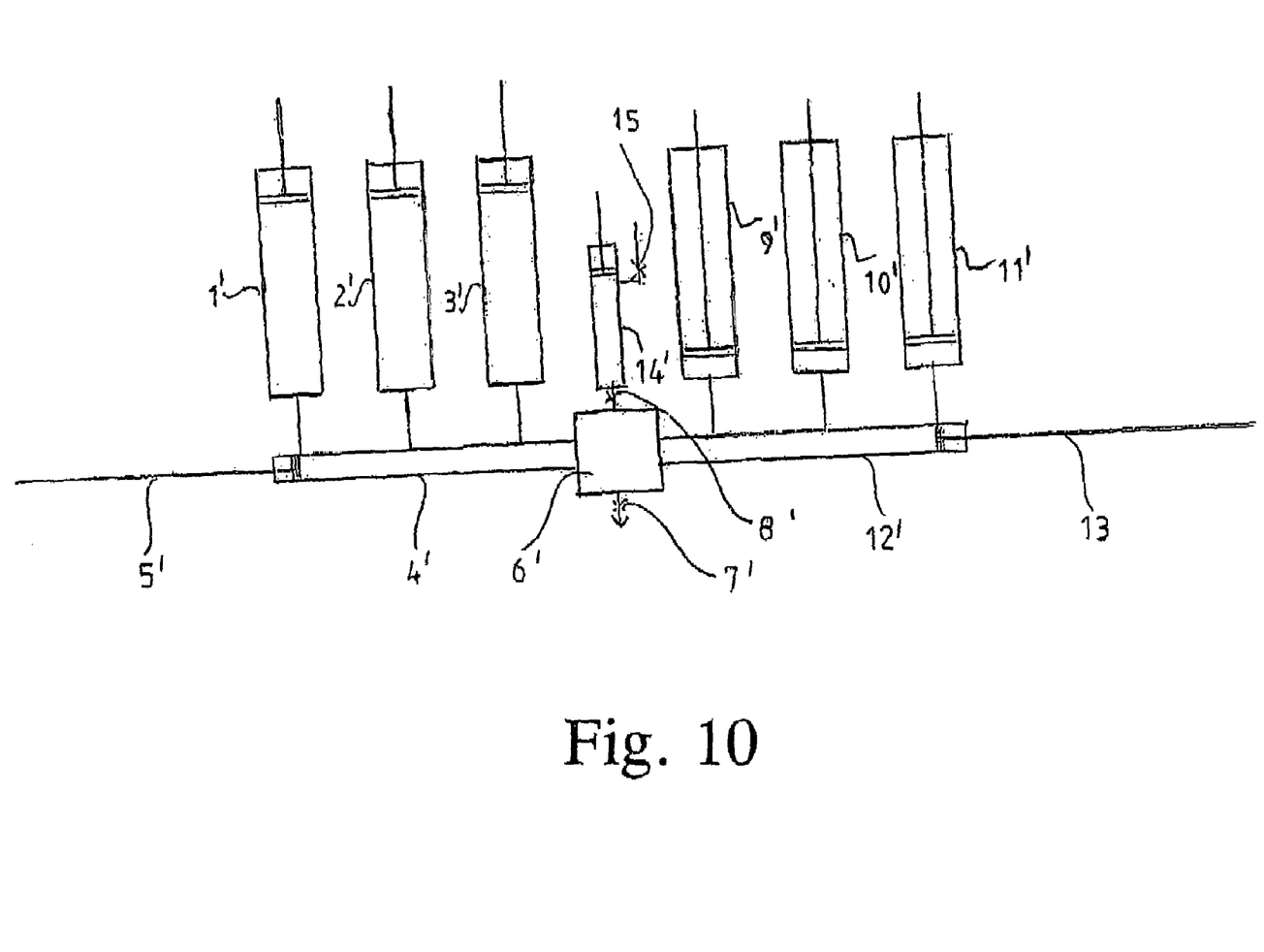
FIG. 10 is a diagrammatic view of a yet further embodiment of an apparatus according to the invention.

A combination of process cylinders is shown in FIG. 10 where a series of process cylinders 1', 2', 3' are connected to a common manifold which here takes the form of a cylinder 4' with a piston 5'. The manifold cylinder 4' is connected to the processing unit 6' provided with a discharge valve 7' and an intake valve 8'. A second combination of cylinders 9', 10', 11' are also connected to a common manifold 12' in the form of a cylinder with a piston 13'.

The purpose of this configuration is to eliminate the dead space problem and also to minimise loss of product in the system. During cycling of product between the two combinations of cylinders the manifold cylinders are used as dead space cylinders as described earlier in connection with FIG. 1. When the process is completed, all the pistons in the process cylinders move down to discharge the product through the valve 7'. When this is done, the pistons 5' and 13 move in to discharge what product is left in the manifolds 4' and 12'. This leaves only the product trapped in the process unit 6'.

In a further refinement, an additive injection cylinder 14' may be connected to the processing unit 6' through valve 8' for injecting additives into said unit. The injection cylinder 14' allows for very accurate synchronising of additives into the product as the displacement of the piston in this cylinder can be mechanically or electronically synchronised with the displacement of the product cylinders 1'-3' and/or 9'-11'.

The invention claimed is:

1. An apparatus for processing a liquid or paste product, said apparatus comprising:
   at least first and second storage chambers;
   an interconnecting conduit configured and arranged to interconnect the first and second storage chambers, the interconnecting conduit having a first end communicating with the first chamber and a second end communicating with the second chamber;
   first and second additional cylinders connected to and communicating with the interconnecting conduit adjacent the first and second ends, respectively, wherein each of the additional cylinders has a volume larger than the volume of the interconnecting conduit;
   processing means within the interconnecting conduit, for processing the product while it is in the interconnecting conduit;
   an axially displaceable storage chamber piston in each of the storage chambers, the storage chamber pistons being operable for the displacement of the product from one of the storage chambers to the other through the interconnecting conduit, such that the product is processed by the processing means during the displacement; and
   an axially displaceable cylinder piston in each of the first and second additional cylinders, the cylinder pistons being operable to displace the product from each of the additional cylinders to an adjacent one of the storage chambers.

2. An apparatus according to claim 1, wherein each of said storage chambers is defined within a storage cylinder having a piston arranged to be axially displaceable from a top position to a bottom position inside said storage cylinder.

3. An apparatus according to claim 2, wherein each of said storage cylinders has a top end connected to a co-axial chamber with a larger interior diameter than the interior diameter of the storage cylinder, said piston being adapted and arranged for being retracted into said co-axial chamber.

4. An apparatus according to claim 3, wherein an aperture is provided in the wall of said co-axial chamber for allowing liquid, paste or solid material to be introduced into said co-axial chamber.

5. An apparatus according to claim 3, wherein an aperture is provided in the wall of said co-axial chamber for allowing gas to be extracted to said vacuum source.

6. An apparatus according to claim 3, wherein a nozzle is provided in the wall of said co-axial chamber for spraying cleaning fluid into the co-axial chamber.

7. An apparatus according claim 3, wherein a mixing device is provided on or at the pressure side of said piston in said storage cylinder.

8. An apparatus according to claim 7, wherein said mixing device is selected from the group consisting of a propeller and an agitating head mounted on the pressure side of said piston and connected to a shaft extending through a passage in the piston rod of said piston.

9. An apparatus according to claim 1, wherein two of said at least first and second storage chambers are located within a common circular cylindrical cylinder with said piston constituting a partition between said two storage chambers.

10. An apparatus according to claim 1, wherein said processing means are selected from the group of processing means consisting of mixing devices, cutting devices, grinding devices, milling devices, heating means, cooling means, chipping devices, blending devices, chopping devices, injection devices for injecting a gas, a liquid or a solid into said product, and extraction devices for extracting a gas, a liquid or a paste from said product.

11. An apparatus according to claim 1, further comprising at least a third storage chamber, wherein the first, second, and third storage chambers are interconnected in series by a plurality of interconnecting conduits.

12. An apparatus according to claim 11, wherein each of a cluster of three or more chambers is interconnected with at least two of the other chambers in said cluster by said interconnecting conduits.

13. An apparatus according to claim 12, wherein at least one chamber of a cluster of chambers is interconnected with at least one chamber of another cluster of chambers by said interconnecting conduits.

14. An apparatus according to claim 1, wherein the at least first and second chambers are interconnected by at least two interconnecting conduits.

15. An apparatus according to claim 1, wherein said interconnecting conduit is flanged directly to said chambers for forming an integral construction.

16. An apparatus according to claim 1, wherein said interconnecting conduit is provided with an inlet for introducing said product into said conduit.

17. An apparatus according to claim 16, wherein said inlet includes a valve arranged and configured to control the injection of the additional fluids into said interconnecting conduit.

18. An apparatus according to claim 1 and further comprising control means for allowing filling and emptying of said additional cylinders with said product during or immediately after said product is discharged from one of said storage chambers.

19. An apparatus according to claim 1, wherein heat exchange means are provided for heating or cooling said product inside said storage chamber.

20. An apparatus according to claim 1, wherein at least one of said storage chambers is connected to a vacuum source.

21. An apparatus according to claim 1, wherein two or more storage chambers forming a first cluster are connected to a common piston displacement means for displacing the pistons in the individual chambers in mutual synchronisation.

22. An apparatus according to claim 21, wherein all said storage chambers of said cluster are connected to a common processing means associated with a common interconnecting conduit communicating with one or more further storage chambers.

23. An apparatus according to claim 1, wherein the interconnecting conduit from the first storage chamber extends to a common processing unit, the interconnecting conduit branching into two branches, each branch extending to a respective second and third storage chamber.

24. An apparatus according to claim 1, wherein an additive cylinder with a piston is connected to one of said interconnecting conduit and said processing means for injecting additive thereto.

25. An apparatus according to claim 12, wherein means are provided for synchronizing the displacement of the piston in said additive cylinder with the displacement of the storage chamber pistons in the first and second storage chambers.

26. An apparatus according to claim 1, wherein the processing means includes a processing chamber within the interconnecting conduit.

27. An apparatus according to claim 26, wherein the processing chamber includes an inlet for the introduction of the product into the interconnecting conduit.

28. An apparatus according to claim 26, wherein the processing chamber includes an outlet configured and arranged for the discharge of the product from the interconnecting conduit.

29. An apparatus according to claim 26, wherein the processing chamber includes a plurality of processing cavities in the interconnecting conduit, each of the processing cavities including a processing device.

30. An apparatus according to claim 29, wherein said processing cavities are located in series.

31. An apparatus according to claim 29, wherein said processing cavities are located in parallel.

32. An apparatus according to claim 1, further comprising means for varying the force applied to the storage chamber pistons in displacing the pistons axially.

33. A method for processing a liquid or paste product in the apparatus of claim 1, said method comprising:
   (a) introducing said product into the first storage chamber;
   (b) displacing the storage chamber piston in the first storage chamber such that the product is displaced through the interconnecting conduit and the processing means and into the second additional cylinder and the second storage chamber; and
   (c) displacing the cylinder piston in the second additional cylinder such that the product in the second additional cylinder is displaced into the second storage chamber.

34. A method according to claim 33, further comprising
   (d) displacing the storage chamber piston in said second storage chamber such that said product is displaced through said interconnecting circuit and said processing means and into said first storage chamber and the first additional cylinder; and
   (e) displacing the cylinder piston in the first additional cylinder such that the product in the first additional cylinder is displaced into the first storage chamber.

* * * * *